United States Patent [19]

van der Malen

[11] Patent Number: 4,481,169
[45] Date of Patent: Nov. 6, 1984

[54] WASHING COLUMN

[75] Inventor: Bernardus G. M. van der Malen, Hagestein, Netherlands

[73] Assignee: Douwe Egberts Koninklijke Tabaksfabriek-Koffiebranderijen-Theehandel N.V., Utrecht, Netherlands

[21] Appl. No.: 453,151

[22] Filed: Dec. 27, 1982

[30] Foreign Application Priority Data

Dec. 28, 1981 [NL] Netherlands .................. 8105872

[51] Int. Cl.³ ............................................ B01J 19/18
[52] U.S. Cl. .................................... 422/110; 422/241; 422/251; 422/112; 422/258; 210/177
[58] Field of Search ............... 210/175, 177, 186, 189, 210/94, 96.1, 97, 194; 422/202, 241, 112, 251, 110, 258

[56] References Cited

U.S. PATENT DOCUMENTS 4,172,877 10/1979 Schwaig ............................ 422/241
4,279,130 7/1981 Finch et al. .......................... 62/544
4,332,599 6/1982 Thijssen et al. ...................... 62/542

FOREIGN PATENT DOCUMENTS 7904919 12/1979 Netherlands .

Primary Examiner—Ivars Cintins
Attorney, Agent, or Firm—Cushman, Darby & Cushman

[57] ABSTRACT

A washing column for the continuous separation between a solid chemical formed in a liquid multi-component system, on the one hand, and the mother liquor in which the solid chemical is suspended, on the other. In a cylindrical working space a stationary, straight, plane washing front is maintained in a packed bed of the solid chemical substance between the mother liquor, on the one hand, and a melt of the solid chemical, on the other. According to the invention, the washing column is double-walled to form an enveloping space, which contains a heat insulating medium and can be pressurized to conform to the pressure within the column. This construction permits the use of a relatively thin, glass inner wall of uniform wall thickness and inner surface. This renders the column resistant to corrosive chemicals, reduces the effect of heat exchange with the surroundings, and prevents instabilities in the washing front.

19 Claims, 4 Drawing Figures

WASHING COLUMN

Dutch patent application No. 79,04919 discloses a washing column with a sharp stable washing front, in particular for the separation of ice crysals from a suspension thereof in an aqueous solution. It was to be expected that the same principles for creating a sharp, stable washing front could be used for the separation of any solid chemical from a suspension thereof in a mother liquor. In the separation of ice crystals from an aqueous solution, the system concerned is normally chemically neutral relative to structural parts, which are pressureresistant, electrically insulating, and preferably transparent. In practice, therefore, the outer wall of the washing column may be made of a synthetic plastics material, such as Perspex (polymethylmetacrylate), which is available at a relatively low price and with a large thickness. For the treatment of many chemicals, however, such a material cannot be used as it would be corroded. It is then ncessary to use glass. In attempts to separate chemicals in a washing column with a glass outer wall, however, it turned out that unexpected difficulties presented themselves, and in particular it turned out to be impossible to create a stable washing front. Further investigation surprisingly showed that these difficulties are not to be attributed to the differences between the physical properties of the solid, normally crystalline chemicals, and those of ice crystals, but are entirely caused by the use of glass for the outer wall of the washing column. The investigation showed the following.

Glass is a much better heat conductor than the synthetic resin materials referred to, which property turned out to cause problems, because with the chemical systems involved, it is often necessary to use temperatures differing considerably from the ambient temperature. A second problem was connected with the necessary large wall thickness of the glass needed to withstand overpressures in the washing process, which normally range between 1 and 9 ats. Glass of large thickness is difficult to provide with the small dimensional tolerances which produce few problems with the synthetic resin materials referred to. As the mechanical strength of glass is inferior to that of the materials that can be used if ice crystals are to be separated from an aqueous mother liquor, it is necessary to use glass of a relatively large thickness. All this leads to the following.

Owing to heat exchange with the surroundings in the packed bed, the temperature close to the wall of the washing column may differ from that of the portion of the packed bed located more inwardly. It turns out that undesirable melting phenomena or crystallization phenomena occur at the wall, which cause differences in porosity in a radial direction. These differences in porosity manifest themselves in a non-planar form of the washing front. As explained in Dutch patent application No. 79,04919, it is the very planeness of the washing front, which must be perpendicular to the axis of the washing column, that is of essential importance for the stability of the washing front. If this is not strictly adhered to, "chanelling" occurs, among other effects, with all consequences of that, as explained in Dutch patent application No. 79,04919.

Channel formation, and generally the instability of the washing front are suprisingly found to be in addition promoted by minor irregularities in wall thickness and in the inner surface of the wall, and through heat transmission via the glass, causing heat exchange between the mother liquor plus solid particles, on the one hand, and the washing liquid (generally consisting of the melt of the solid chemical to be separated) plus solid particles, on the other, which irregularities and heat exchange will be more considerable according as the wall is thicker.

In summary, the following was found:
(a) For the treatment of most chemicals, in particular organic substances, a glass wall of the working space of the washing column is necessary in connection with the required chemical resistance;
(b) in connection with the relatively weak strength of glass and the overpressure required in the washing column for sufficiently packing the bed, the glass must be relatively thick;
(c) owing to the relatively high heat conductivity of glass, the heat exchange with the surroundings, in the radial direction via the glass, is considerable;
(d) owing to this heat conductivity, especially in conjunction with the considerable glass thickness, heat transport via the glass plays a role, whereby interfering heat exchange effects are caused;
(e) hollow glass cylinders are difficult to provide with minor dimensional tolerances, and this applies the more according as the glass thickness and the cylinder diameter are larger;
(f) minor differences in wall thickness and irregularities of the inner surface of the wall promote channel formation;
(g) the effects c, d and f lead to instability of the washing front.

The above problems are solved by the invention.

The invention relates to a washing column for the continuous separation between, on the one hand, a solid chemical substance formed in a liquid multi-component system, and on the other hand, the mother liquor in which this substance is suspended, said washing column comprising a cylindrical wall defining a working space, means for supplying the suspension to the working space, means in said working space for discharging mother liquor from the suspension with retention of the solid chemical substance, means for forming in said working space a packed bed of the solid chemical substance under an absolute pressure higher than 1 at., means for continuously advancing said packed bed in the axial direction in said working space, and means for forming in said packed bed a straight plane washing front perpendicular to the axis of the washing column, between, on the one hand, said mother liquor, and on the other hand, a melt of the solid chemical substance, which washing front is practically stationary relative to the washing column.

According to the invention, this washing column is characterized in that the outer wall of the working space is of glass, said outer wall of the working space is surrounded by a second wall defining with the wall of the working space an enveloping space, a heat-insulating medium being provided in said enveloping space, and means being provided for attuning the pressure in said enveloping space to the pressure in said working space.

In the washing column according to the invention, the outer wall of the working space may consist of thin glass, so that the heat exchange phenomena are rendered harmless.

Preferably, the outer wall of the enveloping space consists, at least in part, of a transparent material, to enable visual observation of the washing front, and if desired regulating said washing front on the basis of optical detection methods.

A suitable heat insulating medium in the enveloping space is air, although other substances may be used, such as oil. If the regulation of the washing front is not effected on the basis of optical detection methods, but for example on the basis of temperature and conductivity measurements, the enveloping space may be filled in addition to pressurized gas, with solid insulating agents, such as balls of synthetic plastics material, glass wool, rock wool, and the like.

Generally speaking, the thickness of the glass will range between 1/30 and 1/20 of the inner diameter of the washing column.

For the treatment of a suspension of a solid chemical substance in the washing column according to the invention, the suspension must first be thickened in the working space, and measures must be taken to enable the thickened suspension to be homogeneously built up to a packed bed, and measures for imparting a translatory movement thereto in the axial direction. The most important point is that the solid particles, before reaching the washing front, should be uniformly distributed throughout the cross-section of the packed bed.

In principle, it is possible to use the entraining effect of the flowing mother liquor for moving the packed bed, and nevertheless ensure a homogeneous build-up of the bed when this reaches the boundary surface between the solution and the washing liquid (the washing front). The entraining effect may bring the solid particles into the zone where the solution is withdrawn. The solid particles which there accumulate may propel other solid particles. At the washing front homogenity may be reached if the washing front is at a sufficient distance from the place where the solution has been withdrawn, even if at the place where the aqueous solution is withdrawn the thickened suspension is initially of inhomogeneous build-up, for example, in case a wall filter is used. This thickened and initially inhomogeneous suspension, however, must be given an opportunity to homogenize or to be homogenized. The suspension must be homogeneous throughout its cross-section when reaching the washing front. This is necessary to prevent radial differences in resistance against liquid flow. If there are such differences, the washing front will not be plane, but exhibit some curvature.

Another possibility is the following. The suspension is supplied near the bottom of a vertical cylinder. The bottom is provided with a sieve gauze, through which the mother liquor is withdrawn. A stirrer-scraper mounted on a shaft extending through the bottom of the cylinder, and driven by a motor, keeps the sieve gauze clean and homogenizes the thickened suspension. The suspension may be supplied laterally or through the (hollow) shaft of the stirrer-scraper. The sieve gauze through which the solution is withdrawn need not be mounted in the bottom, but for example may also be mounted in the cylinder wall adjacent to the bottom. The solid particles accumulating in the bottom portion of the cylinder propel other solid particles to form a packed bed. The liquid in the bottom portion of the cylinder is mother liquor, and the liquid in the top portion is washing liquid. The boundary face between the mother liquor and the washing liquid is the washing front, which is kept at a substantially constant level by regulating the pressure of the incoming suspension and the pressure of the washing liquid. This may be effected as described in more detail hereinafter.

In the top of the cylinder, a scraper may be provided for disintegrating the washed packed bed, and discharging the disintegration product. This, too, will be described in greater detail hereinafter. The disintegration may also be effected by melting.

Preferably the zone where the mother liquor is withdrawn from the suspension comprises hollow blades mounted on a rotary shaft and having perforations therein (provided with sieve gauxe) through which the mother liquor is withdrawn. These blades may be mounted on the shaft in such a manner as to enable them to rotate freely around small shafts at right angles to the main shaft, which means are capable of assuming an inclination depending on prevalent conditions, such as the rate of rotation of the shaft and the entraining effect of the mother liquor withdrawn through these hollow blades. In this case the blades do not provide the energy fro propelling the solid particles, but the moving force is the entraining effect of the mother liquor being withdrawn. The solid particles accumulating owing to the withdrawal of the mother liquor propel other solid particles. If the main shaft on which the hollow blades provided with sieve gauze are mounted so as to be freely movable, is not rotated, these blades will assume a position parallel to the axis of the washing column and point in the direction of the discharge end, in particular if the blades are provided with sieve gauze on both sides. It is of advantage, however, to rotate the main shaft. This will greatly help in preventing any tendency of inhomogeneities being formed owing to the passage of the thickened suspension through the sieve gauze.

Another preferred feature according to the invention is the use of mechanical means for imparting a translatory movement to the thickened suspension of solid particles, whereby a constantly advancing packed bed of these particles is formed. This can be effected, for example, by using inclined blades mounted on the rotary main shaft in such a manner that they exhibit a fixed inclination. In this case, too, the sieve gauze for withdrawing the mother liquor may be provided in the blades if they are hollow. By using mechanical means for advancing the packed bed, this movement is to a great extent rendered independent of the pressures of the incoming suspension, the withdrawn mother liquor, and the washing liquid, and the respective differences between them. By rotation of the blades with a fixed angle of inclination, the filtering layer adjacent to the filter is continously renewed in such a manner that homogeneity is ensured.

In order to facilitate a homogeneous build-up of the packed bed in the radial direction (which, as stated before, is particularly important when the bed reaches the washing front), an annular structure of the bed is recommendable, in particular in the case of large washing column diameters, and if the mother liquor is withdrawn from the suspension through a sieve gauze provided in the direction of movement of the packed bed (for example, a filter in the cylinder wall). It is then possible to use an apparatus comprising a cylinder coaxially disposed within another cylinder of larger diameter. The difference in diameters and the distance between the sieve gauze and the washing front should be selected in such a manner that, under operating conditions, the packed bed near the washing front exhibits a homogeneus build-up. This implies that, generally speaking, if the mother liquor is withdrawn through a sieve gauze in the wall of one cylinder or of both cylinders which together define the annular space in which the packed bed is formed, this annular space must be relatively narrow, for example, 2–5 cm. It will be clear that withdrawing the solution through a sieve gauze in the wall of the column will promote the formation of the inhomogeneities in the packed bed. This tendency is better prevented according as the annular space is narrower (in this connection reference is made to Dutch patent application No. 77,14187).

In case the mother liquor is withdrawn through a sieve gauze mounted more or less perpendicular to the translatory movement of the packed bed, as described before, the annular space may be considerably larger. If, for example, inclined blades are used, and the inner diameter of the outer cylinder of the working space is 100 cm, the ring may have a width of 20 cm. The tendency of an inhomogeneous build-up of the packed bed is then much less.

When an annular structure is used for the packed bed in the working space, the mechanical means, such as inclined blades, used for imparting a translatory movement to the packed bed in the direction of the axis of the cylindrical washing column, and scraper members used for the disintegration of the packed bed after it has passed through the washing front, may be mounted on the inner cylinder. In this case the inner cylinders should be rotated.

It is also possible for the inner cylinder to be kept stationary. In that case the mechanical means for advancing the packed bed and the scraper members, if present, should be driven separately. This will be described in more detail in the description of a preferred embodiment. The inner cylinder, however, may also be mounted on the same shaft as the mechanical means for advancing the packed bed. An optimum possibility of process control may be provided, if desired, by providing the inner cylinder of the working space, the mechanical advancing means, and the scraper members with separate drive mechanisms, so that their respective rates of rotation may be varied as desired.

If inclined blades are used as the mechanical means for advancing the packed bed, it may of advantage to make the inclination of the blades controllable. This increases the possibility of controlling the process to suit particular circumstances as they occur.

The disintegration of the packed bed after it has passed the washing front may be effected by melting. Particularly good results are obtained, however, by using scrapers. Scrapers for this purpose are known per se, for example, from U.S. Pat. No. 3,872,009; in the following description of a preferred embodiment, a slightly modified construction is described. As stated before, the resistance force counteracting the translatory movement of the bed of solid particles will generally cause the bed to become packed. Across the washing front, there will be a "jump" in temperature, as the mother liquor between the solid particles will have a lower temperature than the washing liquid, which normally consists of a melt of the solid substance suspended in the mother liquor. When contacting the washing liquid, some washing liquid between the solid particles will be solidified and thereby cause the solid particles to be cemented together by crystallization. In this way a solid porous plug of the chemical substance is formed at the washing front. The washing front, which is practically stationary relative to the washing column, is moved relative to the packed bed through the pores in the plug. In this way the bed is "internally" washed. The position of the washing front relative to the washing column can be kept substantially fixed by means of a sensor with feedback to the position of the washing front. This may be effected, for example, by means of two temperature sensors placed on different sides of the washing front at a short distance from each other.

The most preferred embodiments of the invention are those in which are annular structure of the working space of the washing column is combined with rotating hollow blades with a fixed inclination, through which the solution is withdrawn from the suspension, and in which the scraper members, on the one hand, and the inclined blades, on the other, are provided with separate drive means. Generally speaking, the scraper members are given a higher rate of rotation than the inclined blades.

One embodiment of the invention will now be described, by way of example, with reference to the accompanying drawings. In said drawings, FIG. 1 is a flow diagram of the various process operations carried out when using the washing column according to the invention;

Figure 1:
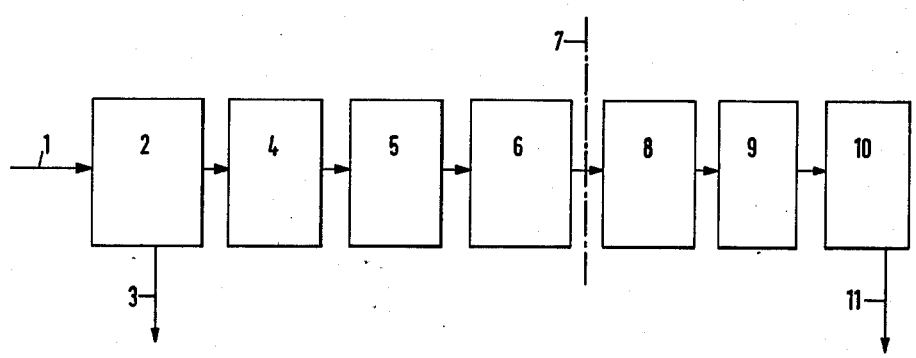

In the flow diagram illustrated in FIG. 1, a suspension of solid particles in mother liquor is supplied at 1. At 2, mother liquor is withdrawn from the suspension, which mother liquor is discharged at 3, leaving a thickened suspension. At 4, the thickened suspension is homogenized and at 5 a packed bed of solid particles is formed. The movement of the packed bed through a stationary layer of mother liquor is represented by 6, which bed then arrives at the washing front 7. The bed subsequently moves at 8 through a substantially stationary layer of washing liquid normally consisting of a melt of the solid chemical substance, whereby normally a solid porous plug 9 is formed, whereafter the plug is disintegrated at 9, and the product of the disintegration is washed away at 10 and discharged at 11. Some of the functions 2, 4, 5 and 6 may be carried out simultaneously, in particular in the embodiments of the invention described above. Thus, for example, when a washing column is used with an annular space and hollow blades with a fixed inclination through which the mother liquor is withdrawn, the functions 2, 4 and 5 may occur pratically simultaneously. Generally speaking, however, it is of great importance that the thickened suspension, when arriving at the washing front, should be homogeneously packed, so that a plane, non-curved washing front perpendicular to the axis of the washing column is formed.

Figure 2:
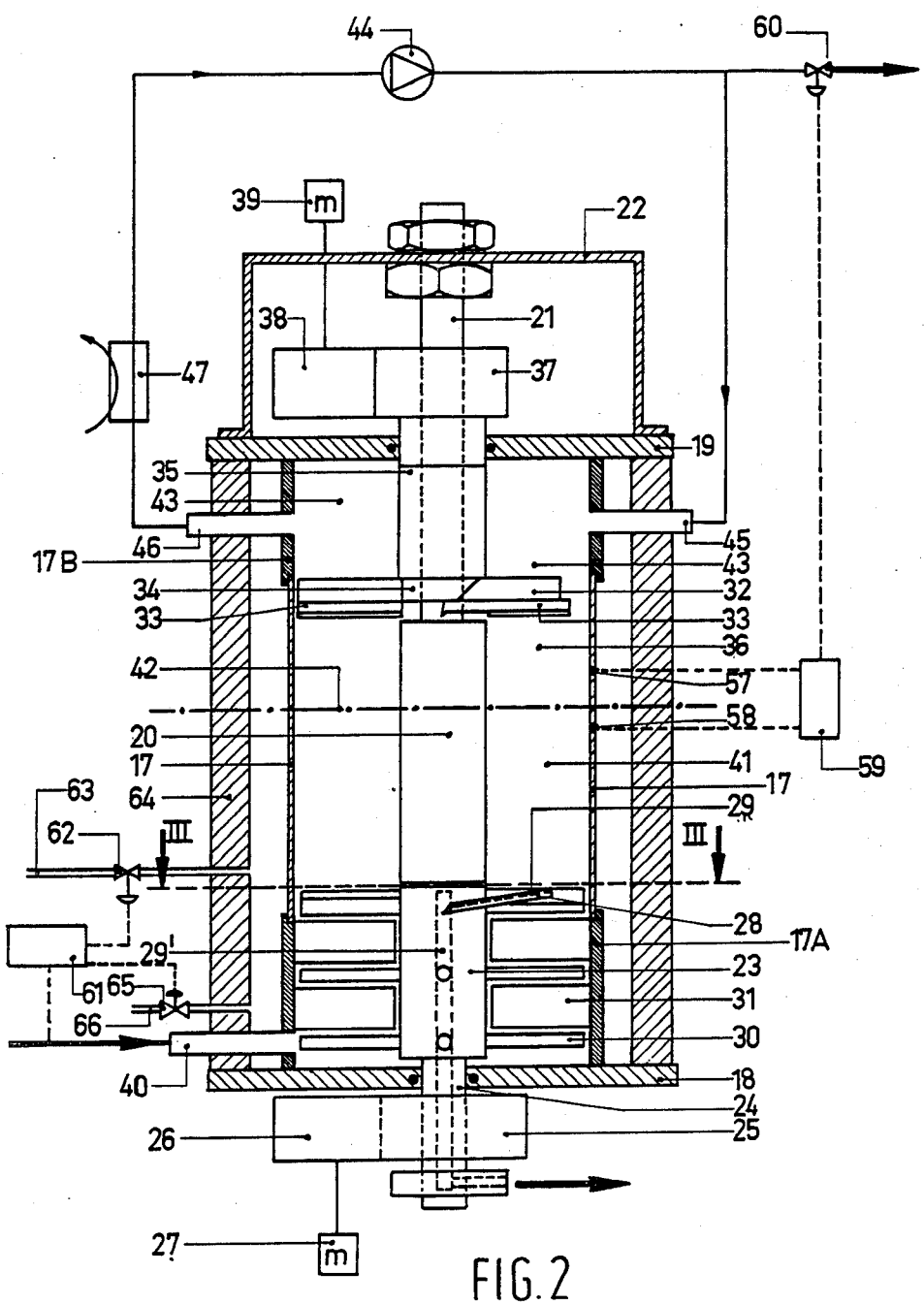
FIG. 2 shows one of the preferred embodiments of the washing column according to the invention, in part-sectional elevation.

FIG. 2 shows a preferred embodiment of the washing column according to the invention, partly in longitudinal section and partly in elevation, so as to show the interior in side-elevational view. A cylindrical glass envelope 17 is confined between two metal cylinders 17A and 17B. The total sub-assembly of 17A, 17 and 17B is in turn confined between a bottom plate 18 and a cover plate 19. Within envelope 17, an inner cylindrical body 20 is shown. Body 20 is connected with a shaft 21, which in turn is connected to a strip 22 bolted to cover plate 19. Another cylindrical body 23 is connected to a shaft 24 carrying a gear wheel 25. Gear wheel 25 cooperates with a gear wheel 26 driven by a motor 27. Body 23 carries hollow inclined blades 28, provided at their upper surface with a sieve gauze 29. The blades are shown in simplified form, and will be described in more detail with reference to FIGS. 3 and 4.

The interior of the hollow blades 28 is in communication with a duct 29', through which liquid can be withdrawn. Body 23 also carries pins 30, while envelope 17 is provided with vertical blades 31.

A disc 32 provided with knives 33 and slots 34 functions as a scraper. Disc 32 is connected to a cylindrical body 35, which is connected to a gear wheel 37 cooperating with a gear wheel 38. Gear wheel 38 is driven by a motor 39.

The suspension is supplied at 40, and is kept in agitation by pins 30 cooperating with blades 31 in order to prevent settling of the solid particles. Mother liquor is withdrawn through the sieve gauze 29, and is discharged through the hollow blades 28 and duct 29' leaving a thickened suspension on the surface of sieve gauze 29. This thickened suspension is packed and propelled through the annular space 41 by rotation of body 23 with blades 28. The dot-dash line 42 represents the washing front, which is the boundary face between space 41, in which the liquid consists of mother liquor, and the space 36, in which the liquid consists of washing liquid, normally a melt of the solid chemical substance.

Temperature sensors 57 and 58 keep the movements of the washing front within narrow limits by means of a control unit 59. They sense a certain temperature difference existing between the mother liquor and the washing liquid. If the washing front moves upwardly and downwardly, this temperature difference will disappear, in which case an electrical pulse from control unit 59 will further open or close a valve 60.

Space 36 will generally be filled with a solid porous plug, which is disintegrated by rotation of disc 32 with knives 33. The particles formed by this disintegration find their way into space 43 through slots 34. By means of a pump 44, the washing liquid is circulated. This washing liquid enters space 43 and 45 and washes away the particles through 46. The particles are melted by means of a melting device 47. If the place of the washing front turns out to be fixed, the quantity of washing liquid leaving the system to valve 60 will be equal to the quantity of solid substance discharged by scraper 32. If the washing front moves downwards, valve 60 is opened somewhat further, so that more washing liquid is discharged, and the other way round. In this way the equilibrium is restored.

Provided between bottom plate 18 and cover plate 19 is a hollow cylinder 64 of synthetic plastics material, and having a thick wall. The insulation space between the glass cylinder wall 17 and the hollow cylinder 64 of synthetic plastics material is maintained at a pressure equal to the washing pressure in the washing column. This is effected by a control unit 61. This unit measures the pressure in the supply line 40 of the suspension. If the pressure is exceeded in the insulation space, insulating medium, normally gas, is let off through valve 65 via duct 66; if the pressure is fallen short of, insulating medium is supplied through valve 62 via duct 63.

Figure 3:
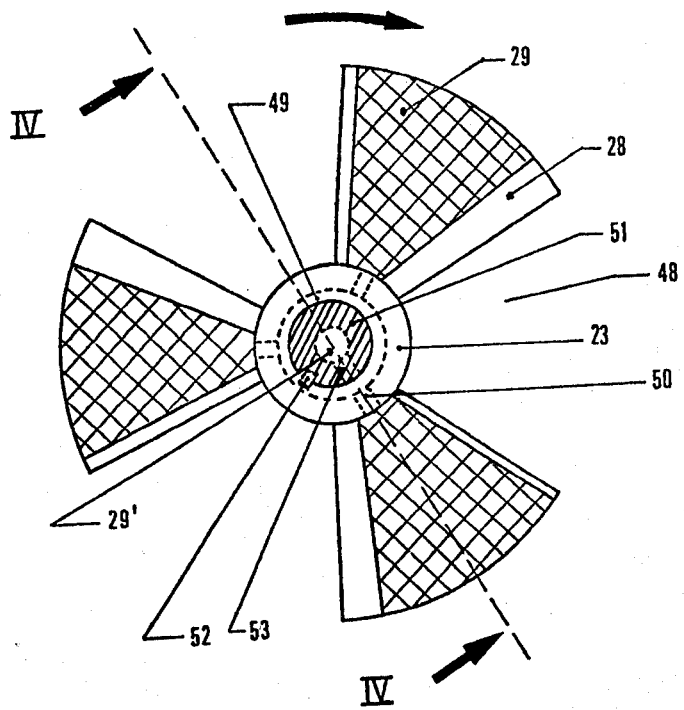
FIG. 3 is a top view of the cross-section taken on the line III—III of FIG. 2.

FIG. 3 shows the sieve gauze 29 of one of the inclined blades with an edge 28. Between two inclined blades, there is a space 48, through which the suspension passes. The blades are secured to cylindrical body 23, in which a circular groove 49 is provided. The interior of the hollow inclined blades is in communication with the circular groove 49 via channels 50. The annular cylindrical body 23 is secured to shaft 51 by means of a protecting pin 52. Shaft 51 is provided with a central channel 29', which via a channel 53 is in communication with the circular groove 49.

Figure 4:
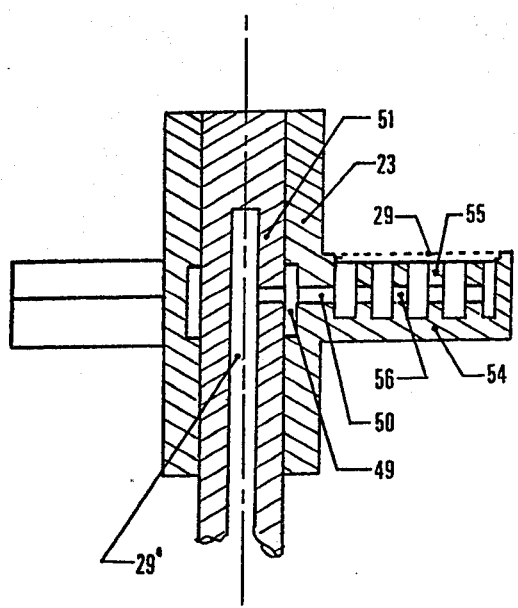
FIG. 4 is a cross-sectional view of a hollow blade, taken on the line IV—IV of FIG. 3.

FIG. 4 shows that the bottom 54 of the blade is provided in longitudinal direction with ridges 55 for supporting the sieve gauze 29. Ridges 55 are provided with apertures 56 for the discharge of the mother liquor. The blade is secured to the cylindrical body 23, which is provided with the channel 50 and the groove 49, where the liquid from all blades is collected. Cylindrical body 23 is secured to shaft 51, which is provided with the central channel 29', through which the mother liquor is discharged.

It will be clear that the apparatus as described, and other related embodiments with hollow blades can serve as a continuous suspension thickener, if the disintegrator is omitted.

It will also be clear that, instead of hollow blades, for example, a bottom filter may be used for the discharge of the liquid. Non-perforated blades are then arranged to rotate just above such bottom filter to drive along the crystal mass to form a packed bed. This kind of construction is described (in that case for freeze concentrating aqueous solutions) in the co-pending application Ser. No. 418,832 (see FIG. 5).

A washing column as described above, which was provided with a glass cylinder having an internal diameter of 152.4 mm, a height of 296 mm, a wall thickness of 5.8 mm, and an annular working space of 31.4 mm, measured in the radial direction, was used for the treatment of a mixture of 81% by weight of p-xylene, 5% by weight of o-xylene, 10.5% by weight of m-xylene and 3.5% by weight of ethyl benzene. The mixture was first cooled to $+2°$ C., at which p-xylene crystallized. The supply rate was 250 kg/hour. Per hour, 60 kg p-xylene of purity 99.965% was separated. It is clear that the washing column makes possible a very sharp separation, while practically no washing liquid is lost.

Generally speaking, the separation of a chemical substance from a mixture by crystallization offers great advantages if the boiling point is high and/or if there is a danger for decomposition at elevated temperature and/or if the mixture contains substances having a boiling point close to that of one or more other components in the mixture. Indeed, the invention is of practical importance for the recovery of, for example, p-dichlorobenzene, p-xylene, chloroacetic acid, naphthalene and the like from mixtures in which these substances commonly occur.

What I claim is:

1. A washing column for the continuous separation between a solid chemical substance formed in a liquid multi-component system and the mother liquor in which this substance is suspended comprising:
   a cylindrical wall defining a working space;
   means for supplying the suspension to said working space;
   means in said working space for discharging mother liquor from the suspension with retention of the solid chemical substance;
   means for forming in said working space a packed bed of said solid chemical substance under an absolute pressure exceeding 1 atmosphere;
   means for continuously advancing said packed bed in said working space in the axial direction; and means for forming a straight, plane washing front in said packed bed, perpendicular to the axis of the washing column between the mother liquor and a melt of said solid chemical substance, said washing front being practically stationary relative to the washing column, characterized in that the outer wall of said working space is of glass, said outer wall of the working space is surrounded by a second wall defining with the wall of said working space an enveloping space, a heat insulating medium is provided in said enveloping space, and means for attuning the pressure in said enveloping space to the pressure in said working space.

2. A washing column according to claim 1, characterized in that said second wall is made at least in part of a transparent material.

3. A washing column according to claim 1 or 2, characterized in that the heat insulating medium in said enveloping space is air.

4. A washing column according to claim 1 or 2, characterized in that the heat insulating medium in said enveloping space is oil.

5. A wash column for the continuous separation between a solid chemical substance formed in a liquid multicomponent system and the mother liquor in which said substance is suspended comprising:
means defining a central working space including a first cylindrical body defined by an inner cylindrical wall of glass, and an outer cylindrical wall coaxially mounted with respect to said inner cylindrical wall to provide an insulating space therebetween, and end plates closing said working and insulating space;
means for supplying said system to said working space;
means for withdrawing said mother liquor from said working space to form a thickened slurry;
means for advancing said substance from said supplying means to form a packed bed with a planar wash front extending perpendicular to the direction of advance;
means for removing said solid substance from said working space; and
means for maintaining said working and insulating spaces at substantially the same pressure.

6. A wash column as in claim 5, wherein said withdrawing means and said removing means are disposed on opposite sides of said wash front.

7. A wash column as in claim 5, wherein said advancing means includes a plurality of rotating blades mounted for rotation about a central shaft and means for driving said blades.

8. A wash column as in claim 5, further including means for maintaining said wash front at a substantially fixed position.

9. A wash column as in claim 5, further including first and second sensors for sensing the temperature on respective sides of said wash front and control means for controlling said removing means in accordance with the sensed temperatures to maintain said wash front at said substantially fixed position.

10. A wash column as in claim 5, further including means for melting the removed substance and recirculating a portion thereof to said working space to provide wash liquid.

11. A wash column as in claim 5, wherein said working space is an annular space defining between said walls and a central cylindrical body mounting said advancing means.

12. A wash column as in claim 11, wherein said discharging means includes a sieve gauze.

13. A wash column as in claim 12, wherein the width of said annular space is between 2 and 5 cm.

14. A wash column as in claim 5, wherein said outer wall is a synthetic plastic.

15. A wash column as in claim 5, wherein said advancing means includes a plurality of hollow, inclined rotating blades mounted for rotation having apertures therethrough for withdrawing mother liquor and said withdrawing means includes means in communication with the hollow interiors of said blades for withdrawing said mother liquor therefrom.

16. A wash column as in claim 5, further including a sieve gauze extending across said working space between said blades and said wash front.

17. A wash column as in claim 5, wherein said advancing means includes a plurality of fixed blades and first means for rotating said blades and said removing means includes blade means for disintegrating the solid substance and means independent of said first means for rotating said blade means.

18. A wash column as in claim 5, wherein the thickness of the glass is between 1/20 and 1/30 the inner diameter of the column.

19. A wash column for the continuous separation between a solid chemical substance formed in a liquid multicomponent system and the mother liquor in which said substance is suspended comprising:
means defining an annular central working space including a first cylindrical body defined by an inner cylindrical wall of glass and an outer cylindrical wall coaxially mounted with respect to said inner cylindrical wall to provide an insulating space therebetween, a second cylindrical body defining with said inner wall said annular space, and end plates closing said working and insulating spaces;
means for supplying said system to one end of said working space;
means for withdrawing said mother liquor from said one end of said working space;
means for advancing said solid substance from said supplying means to form a packed bed with a planar wash front extending perpendicular to the direction of advance;
means for removing said solid substance from the other end of said working space; and
means for maintaining said working and insulating spaces at substantially the same pressure.

* * * * *